United States Patent [19]

Herrmann et al.

[11] Patent Number: 5,735,589
[45] Date of Patent: Apr. 7, 1998

[54] SLIDING REFRIGERATOR SHELF ASSEMBLY

[75] Inventors: Robert S. Herrmann, Grand Haven; Edmund J. Kane, Holland, both of Mich.

[73] Assignee: Donnelly Technology, Inc., Holland, Mich.

[21] Appl. No.: 571,124

[22] Filed: Dec. 12, 1995

Related U.S. Application Data

[63] Continuation of Ser. No. 236,629, Apr. 29, 1994, abandoned.

[51] Int. Cl.$^6$ ..................................... F25D 11/00
[52] U.S. Cl. .................. 312/408; 312/334.44; 108/108; 108/102; 211/153
[58] Field of Search .................. 312/408, 410, 312/404, 334.46, 334.44; 108/108, 102; 211/153, 151; 248/247, 250

[56] References Cited

U.S. PATENT DOCUMENTS

| | | | |
|---|---|---|---|
| 1,774,312 | 8/1930 | Braeutigam . | |
| 1,830,044 | 11/1931 | Vandoren . | |
| 2,093,137 | 9/1937 | Reeves | 62/89 |
| 2,276,942 | 3/1942 | Dibble | 211/143 |
| 2,306,802 | 12/1942 | Harbison | 62/89 |
| 2,519,623 | 8/1950 | Baker | 45/77 |
| 2,689,778 | 9/1954 | Chambers et al. | 312/351 |
| 2,735,741 | 2/1956 | Laben | 312/351 |
| 2,759,733 | 8/1956 | Wilmer et al. | 308/3.6 |
| 2,876,910 | 3/1959 | Morton, Jr. | 211/153 |
| 2,997,356 | 8/1961 | Hilliker et al. | 312/348 |
| 3,311,072 | 3/1967 | Pattison | 312/330.1 X |
| 3,633,983 | 1/1972 | Whitcomb | 312/306 |
| 3,722,974 | 3/1973 | Hartman | 312/348.2 |
| 3,751,126 | 8/1973 | Hudson | 308/3.6 |
| 4,173,378 | 11/1979 | Hanson et al. | 312/330.1 X |
| 5,340,209 | 8/1994 | Kolbe et al. | 312/408 |
| 5,362,145 | 11/1994 | Bird et al. | 312/408 |
| 5,441,338 | 8/1995 | Kane et al. | 312/408 |

FOREIGN PATENT DOCUMENTS

| | | |
|---|---|---|
| 581419 | 2/1994 | European Pat. Off. . |
| 3431666 | 3/1986 | Germany . |
| 4038172 | 6/1992 | Germany . |
| 60-68916 | 4/1985 | Japan . |
| 93 23229 | 11/1993 | WIPO . |

*Primary Examiner*—Peter M. Cuomo
*Assistant Examiner*—Janet M. Wilkens
*Attorney, Agent, or Firm*—Van Dyke, Gardner, Linn & Burkhart

[57] ABSTRACT

A shelf assembly for a refrigerator compartment such as a refrigerator for food products includes a shelf member slidably supported for extension and retraction on a shelf support. The shelf member includes side members which are preferably molded as a rim on an article support surface from an ethylene-polypropylene copolymer and include slide surfaces engaging spaced, generally horizontal and parallel shelf support surfaces preferably formed by L-shaped brackets on the shelf support. A guide member depends from at least one, and preferably both, of the side members to guide the sliding movement. A stop on the guide member limits travel by engaging a limit surface on the shelf support. The guide member and stop may be molded integrally with the side members to define a molded slide channel or formed by a rigid insert embedded in the rim during molding. The method includes injecting the moldable around a rigid core positioned in a mold cavity and withdrawing the core after removing the molded rim to leave a slide channel in the rim.

41 Claims, 10 Drawing Sheets

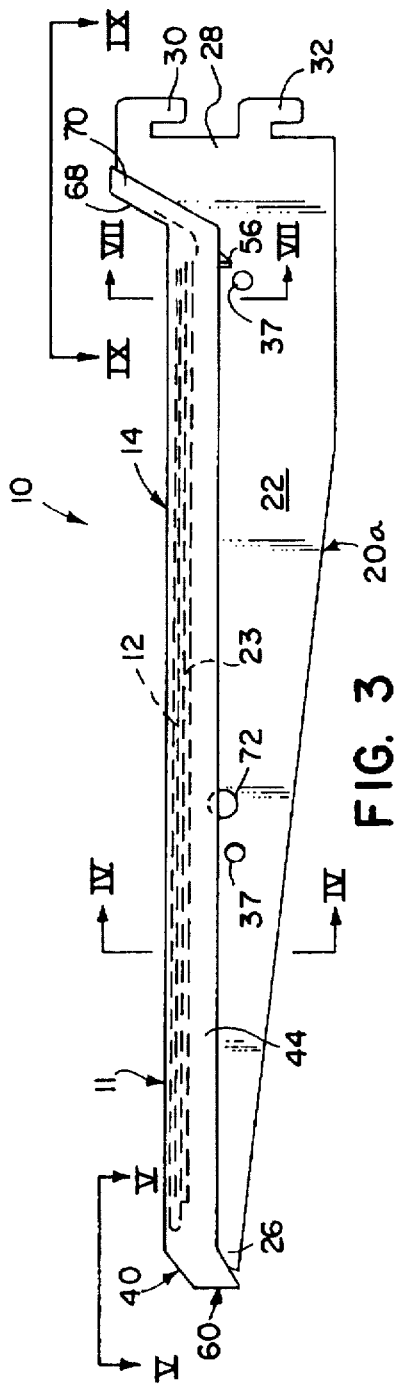
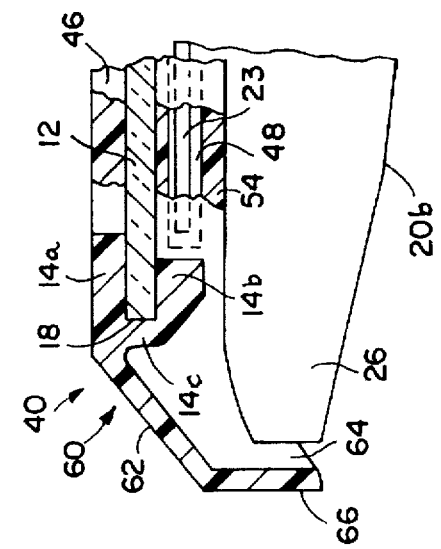
FIG. 6
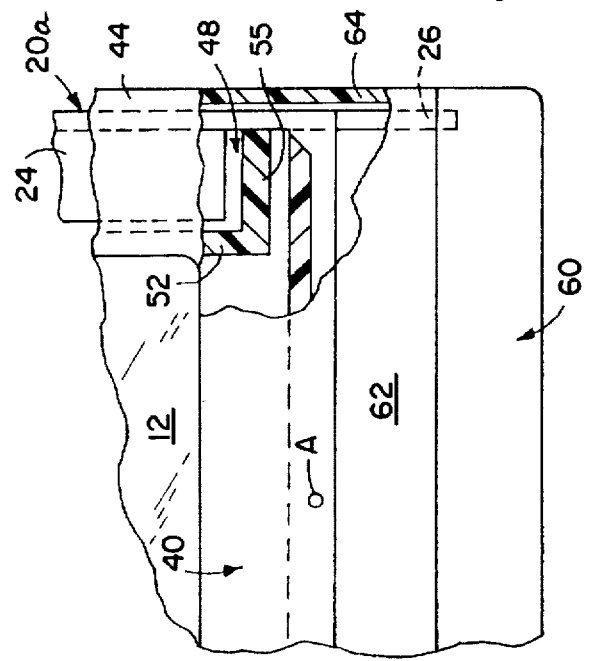
FIG. 5
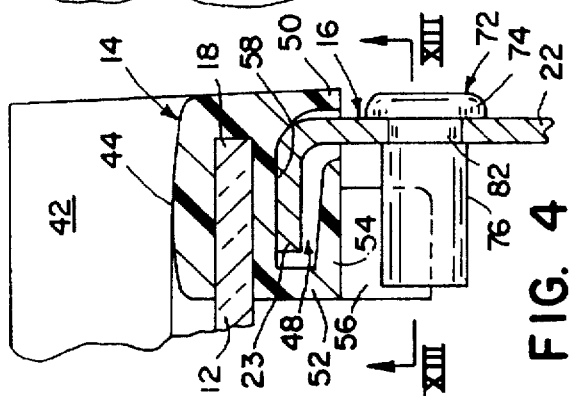
FIG. 4
FIG. 3

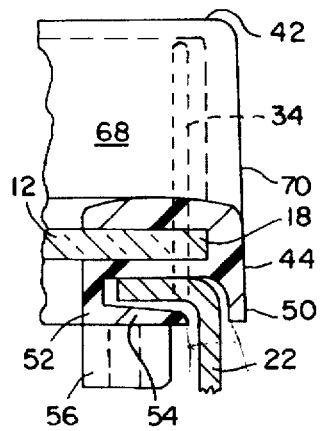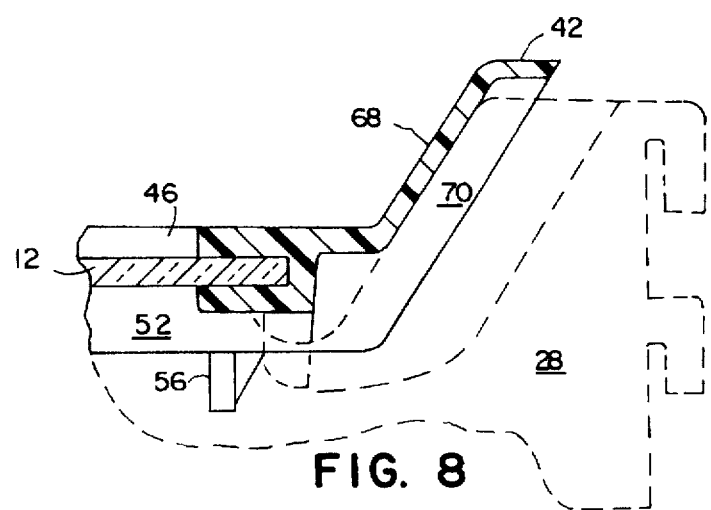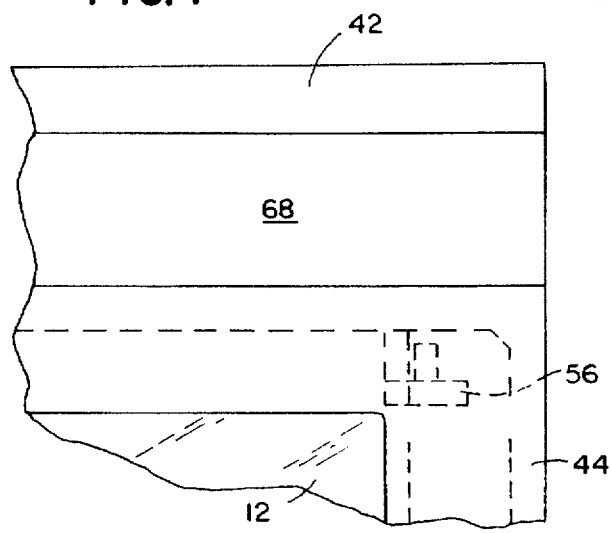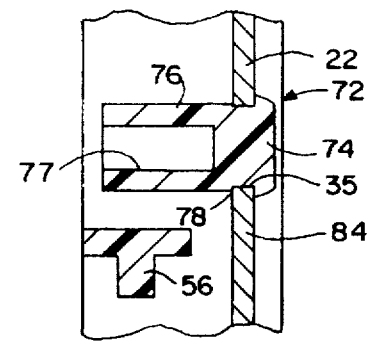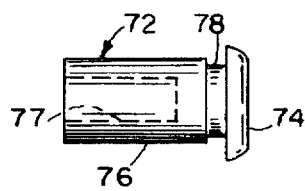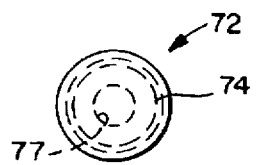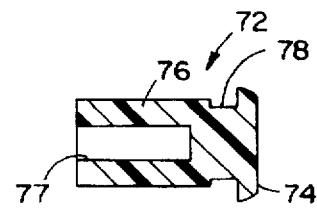

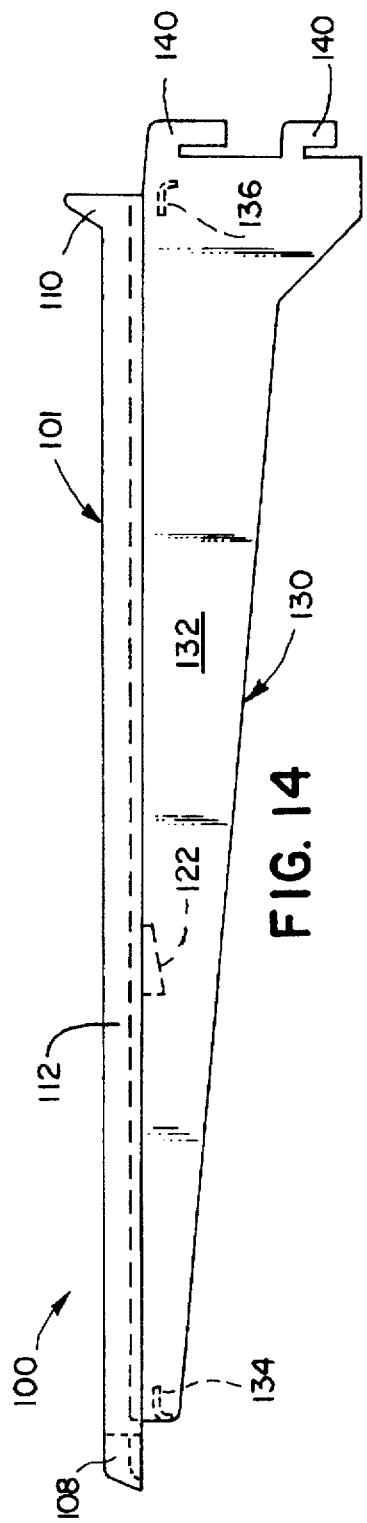
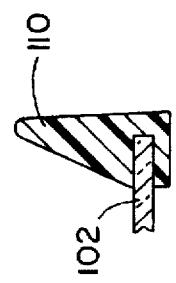
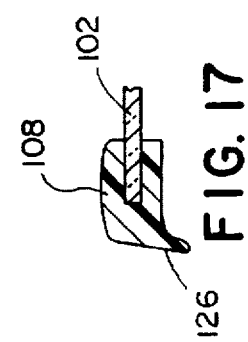
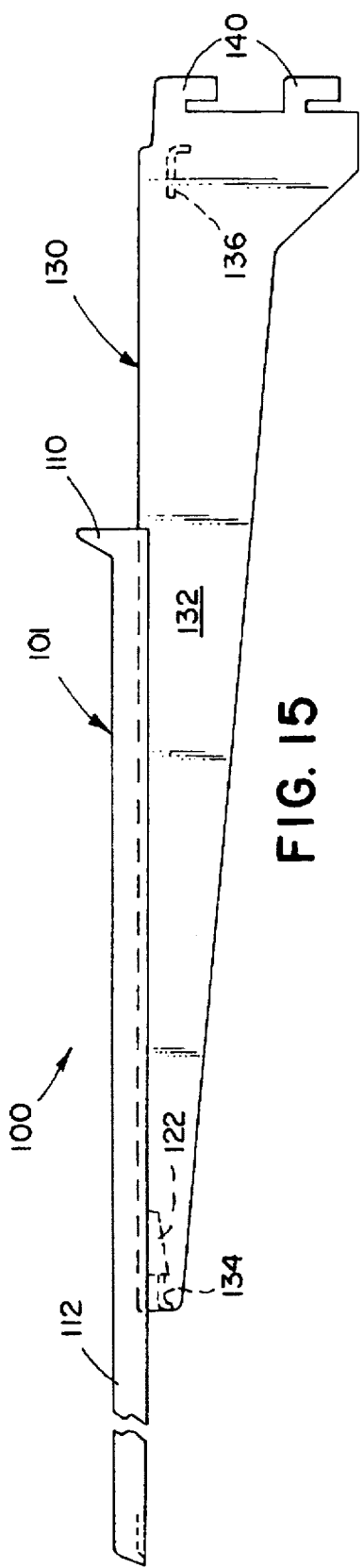

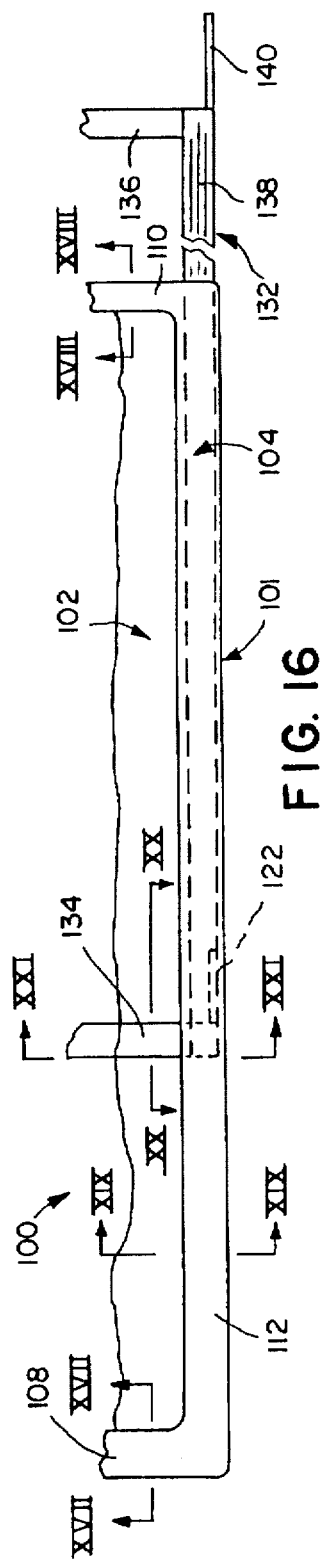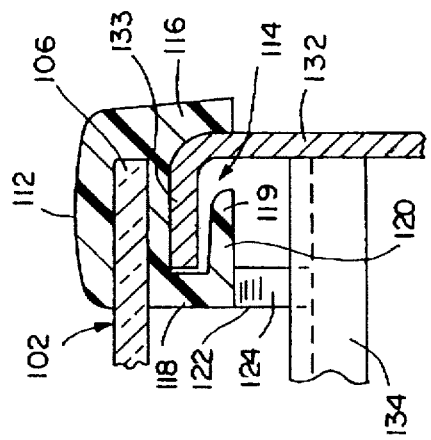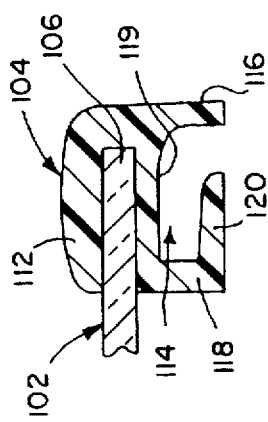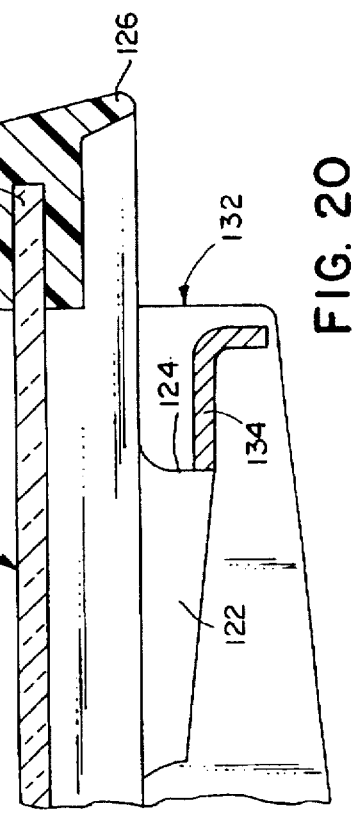

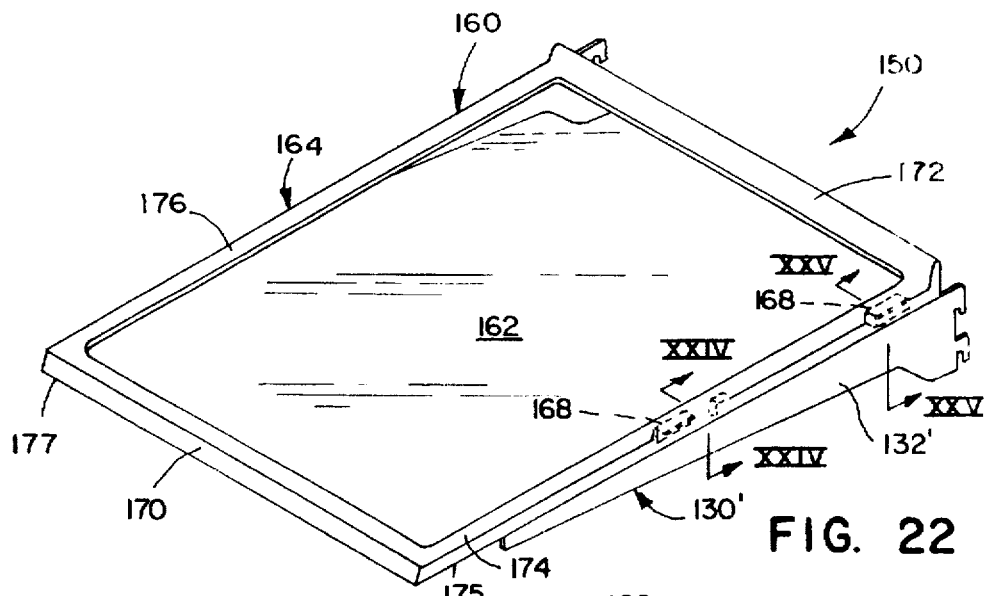
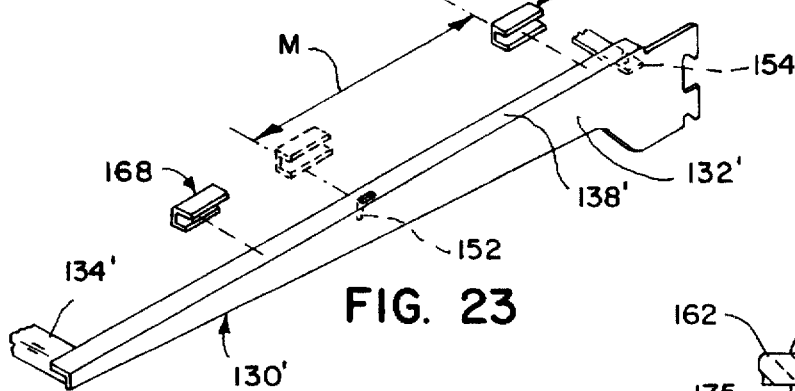
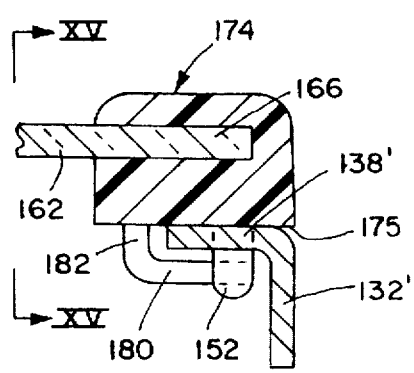
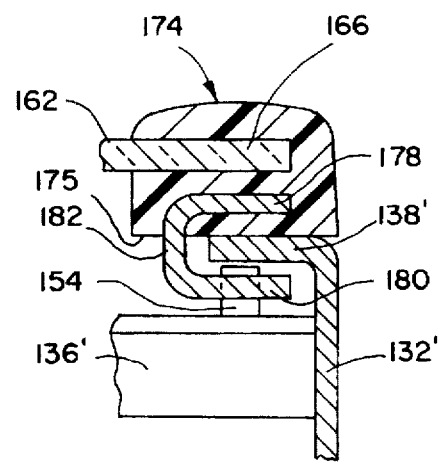
FIG. 22
FIG. 23
FIG. 24
FIG. 25

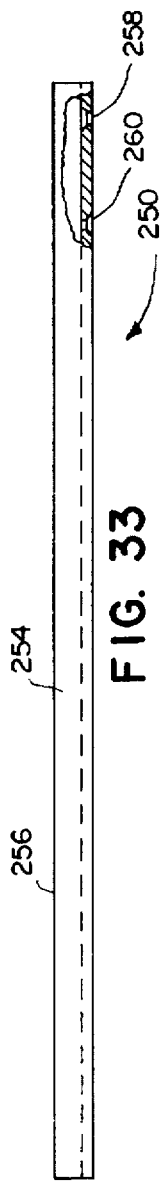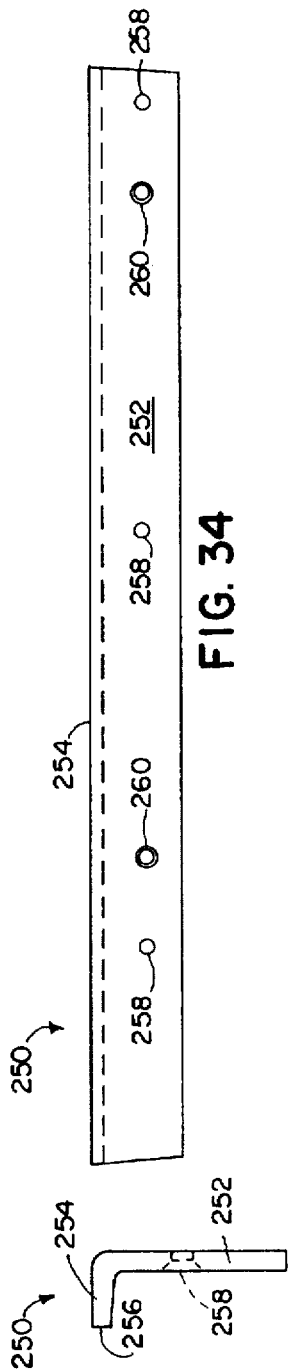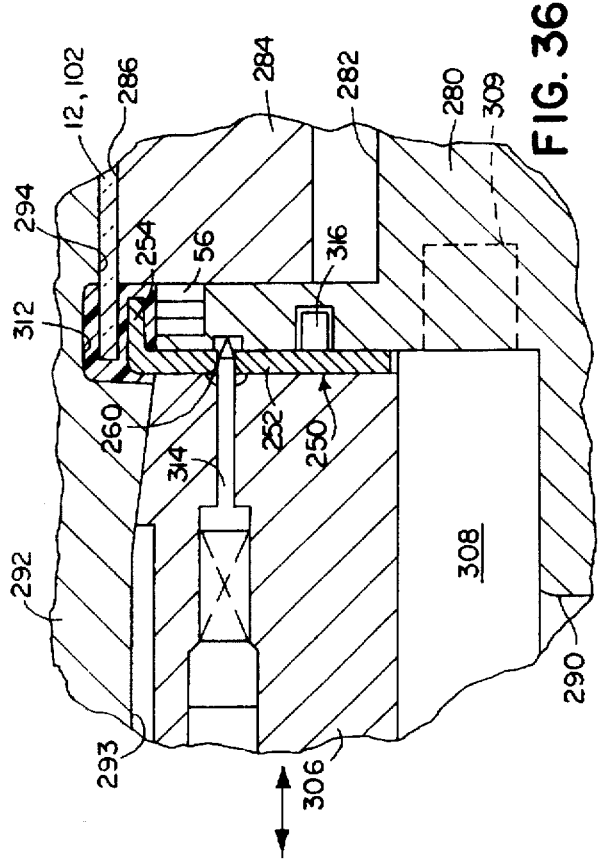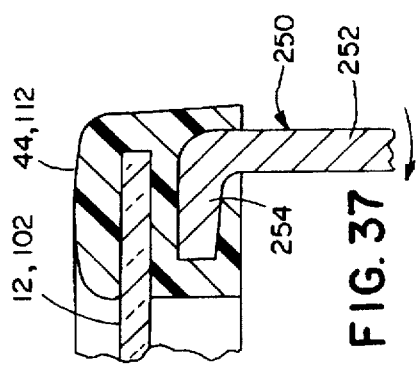

SLIDING REFRIGERATOR SHELF ASSEMBLY

CROSS REFERENCE

This is a continuation of application Ser. No. 08/236,629, filed Apr. 29, 1994, now abandoned.

BACKGROUND OF THE INVENTION

This invention relates to shelving especially adapted for use in refrigerator compartments, especially refrigerators for food products, and more particularly, to a sliding shelf assembly for refrigerators having improved weight supporting capabilities, improved sliding movement, and an improved method for manufacturing.

Many varieties of sliding refrigerator shelving have been used in the past. Typically, such sliding shelves include a shelf panel mounted for horizontal sliding extension toward the user through the door opening of the refrigerator to provide better access to items stored on the shelf or for ease in cleaning. One prior shelf includes a plurality of preformed frame members assembled around a shelf panel and slidably secured on appropriate support brackets. In another, tracks on opposite side surfaces guide sliding movement of the shelf panel.

In certain of the prior known sliding shelves, difficulty in extending and retracting the shelf was experienced, especially when the shelf was heavily loaded with articles for refrigeration. In some cases, uneven extension required additional effort, while in others, the support strength in the extreme extended position, was less than desired.

In addition, many prior known sliding shelf assemblies required manufacture from a number of individually fabricated pieces increasing manufacturing time and expense. Such shelves would not contain liquids if spilled, and thus would not limit contamination of the refrigerator or cabinet in the event a container was overturned. In many prior known molded shelves, specialized mold apparatus was required and the appearance of the sliding shelf assembly was often different from the standard, fixed shelves used adjacent to the sliding shelves in the same refrigerator.

Accordingly, a need has existed for an improved sliding shelf assembly for refrigerators which would control and help confine spillage of liquids or other food items while providing improved sliding characteristics even when heavily loaded, increased support strength in both the extended and retracted positions, a similar appearance to standard, fixed position shelving used in the same refrigerator, and improved, simplified manufacturing techniques reducing manufacturing time and expense.

SUMMARY OF THE INVENTION

Accordingly, the present invention provides a shelf assembly for refrigerated compartments, and especially refrigerators for food products, in which a shelf member is slidably mounted for extension and retraction on a shelf support, the shelf member including side members which are molded in one piece on an article support surface from a moldable material while incorporating either a molded guide member or an embedded insert which guides sliding movement and restricts vertical movement of the shelf with respect to the support. One of several varieties of a stop member for limiting extension or retraction is included. The invention also encompasses a manufacturing method including the provision of a rigid core having a portion embedded within the molded slide member, which core is withdrawn after molding to provide a slide channel avoiding the necessity of assembling the slide member from multiple parts and also allowing use of the same mold cavity used to form fixed refrigerator shelf versions.

In one form, the invention is a shelf assembly for a refrigerated compartment including a shelf support and a shelf member slidably mounted for extension and retraction on the shelf support. The shelf support includes a pair of spaced, generally horizontal, generally parallel shelf support surfaces and a guide surface extending at an angle to each shelf support surface. At least one mounting member is adapted to mount the shelf support in a refrigerated compartment. The shelf member includes a pair of spaced side members molded in one piece on an article support surface from a moldable material, the side members extending along opposite sides of the article support surface. Each side member includes a slide surface engaging one of the shelf support surfaces. At least one of the side members has a depending guide member adjacent the guide surface to guide sliding movement of the shelf member, the guide member also including a stop. The shelf support also includes an elongated opening for receiving and allowing movement of the shelf when the shelf member is slidably extended or retracted and at least one limit surface for engaging the stop member to limit at least one of the extension and retraction of the shelf member.

In preferred aspects of the invention, the guide member and stop are molded integrally and in one piece with the side member while a second guide member is also molded on each side member to confine the shelf support surface for proper sliding movement. The guide members and slide surface are defined by a slide channel which, in the preferred form, is formed by the preferred method set forth herein.

In other preferred aspects, the guide member and stop may be formed by a rigid insert embedded within the molded side member during molding and having a portion extending downwardly from the side member along and under the shelf support to restrict sliding and vertical movement of the shelf. Such rigid insert can be either a U-shaped member or a headed stud.

Preferably, the shelf support includes a pair of L-shaped support brackets, each including a vertical body and a laterally extending flange, the flange having a top surface forming the shelf support surface. The limit surface may be formed either on the L-shaped bracket or on a cross member spacing the L-shaped bracket members apart. In the version incorporating the headed stud guide member, a slot is formed in the flange of the L-shaped bracket receiving the stud for both guiding and limiting sliding movement.

In another aspect of the invention, a method for making a sliding shelf includes the provision of a rigid core having a slide channel forming portion thereon. The core is inserted in a mold apparatus such that the slide channel forming portion is located in the mold cavity. A slide member is molded from moldable material on an article support surface in the mold cavity while embedding the slide channel forming portion in the slide member. The molded slide member is then removed from the mold cavity with the slide channel forming portion remaining embedded within the slide member. Thereafter, the slide channel forming portion of the core is withdrawn from the slide member to form a channel within the slide member, the channel adapted to receive a slide support for sliding movement of the shelf.

In preferred aspects of the method, injectable polymeric material, such as a thermoplastic copolymer, is injected around the slide channel forming portion while a retaining portion of the core extends out of the slide member to form an opening to the slide channel. Preferably, the article supporting surface is formed by a glass panel member having a perimeter edge simultaneously embedded within the slide member when the core is embedded therein. The core may then be rotated and slid out of the molded side member to complete the manufacture.

In its various forms, the present invention provides numerous advantages over prior known sliding shelf assemblies for refrigerators. The shelf assembly includes molded side members integrally incorporating a molded slide channel having guide members which allow smooth, uniform sliding extension and retraction of the shelf even when heavily loaded and without bothersome ratcheting or stuttering during sliding movement. Such construction maximizes available shelf space for storage while maintaining smooth shelf operation. The molded rim effectively controls and confines spilled liquids or other items on the shelf and is tightly sealed to the shelf panel to prevent unsanitary seepage between the rim and panel. The combination of support brackets and molded slide surfaces along with guide members which extend under the slide support surfaces prevent tipping, lifting or vertical movement of the shelf to allow the support of greater loads in both the extended and retracted positions. Manufacture of the sliding shelf is simplified through the use of a mold apparatus which allows embedding of a reusable core which can be withdrawn from the molded shelf after molding to leave a molded slide channel ready for installation on the shelf support. Alternately, rigid inserts can be positioned in the mold cavity for embedding within the molded shelf to provide the guide members and stops allowing improved sliding movement. In addition, the method allows use of the same mold apparatus used to manufacture fixed, stationary shelf assemblies simply by the inclusion or omission of the core or rigid inserts and substitution of appropriate fixed shelf support members in the mold cavity.

These and other objects, advantages, purposes, and features of the invention will become more apparent from a study of the following description taken in conjunction with the drawings.

BRIEF DESCRIPTION OF THE DRAWINGS

FIG. 3 is a side elevation of the shelf assembly of FIG. 1;

FIG. 4 is a fragmentary sectional view taken along plane IV—IV of FIG. 3;

FIG. 5 is a fragmentary, plan view of a front corner of the shelf assembly taken in area V of FIG. 1 with portions broken away;

FIG. 6 is a sectional side elevation of the front area of the shelf assembly taken along plane VI—VI of FIG. 1;

FIG. 7 is a fragmentary, sectional view taken along plane VII—VII of FIG. 3;

FIG. 8 is a sectional view taken along plane VIII—VIII of FIG. 1;

FIG. 9 is a fragmentary plan view of a rear portion of the shelf assembly taken along plane IX—IX of FIG. 3;

FIG. 10 is a side view of a molded limit member for use with the shelf assembly of FIG. 1;

FIG. 11 is an end elevation of the limit member of FIG. 10;

FIG. 12 is a sectional side elevation of the limit member of FIGS. 10 and 11;

FIG. 13 is a sectional view of the shelf assembly showing the limit member inserted and taken along plane XIII—XIII of FIG. 4;

FIG. 14 is a side elevation of a second embodiment of the sliding shelf assembly of the present invention;

FIG. 15 is a side elevation of the shelf assembly of FIG. 14 with the sliding shelf member in extended position;

FIG. 16 is a fragmentary plan view of the shelf assembly of FIG. 15;

FIG. 17 is a fragmentary, sectional view taken along plane XVII—XVII of FIG. 16;

FIG. 18 is a fragmentary, sectional view taken along plane XVIII—XVIII of FIG. 16;

FIG. 19 is a fragmentary, sectional view taken along plane XIX—XIX of FIG. 16;

FIG. 20 a fragmentary, sectional view taken along plane XX—XX of FIG. 16;

FIG. 21 is a fragmentary, sectional view taken along plane XXI—XXI of FIG. 16;

FIG. 22 is a top perspective view of a third embodiment of the sliding shelf assembly of the present invention;

FIG. 23 is a fragmentary, exploded view of portions of the shelf assembly of FIG. 22;

FIG. 24 is a fragmentary, sectional view taken along plane XXIV—XXIV of FIG. 22;

FIG. 25 is a fragmentary, sectional view taken along plane XXV—XXV of FIG. 22;

FIG. 33 is a top plan view of a core member used in molding the shelf assemblies of FIGS. 1-21;

FIG. 34 is a side elevation of the core member of FIG. 33;

FIG. 35 is an end elevation of the core member of FIGS. 33 and 34;

FIG. 36 is a sectional view of a preferred mold apparatus for making the shelf assemblies of FIGS. 1-21; and FIG. 37 is a fragmentary, sectional view of the shelf member of FIGS. 1-21 after molding but before removal of the embedded core.

DESCRIPTION OF THE PREFERRED EMBODIMENTS

Figure 1:
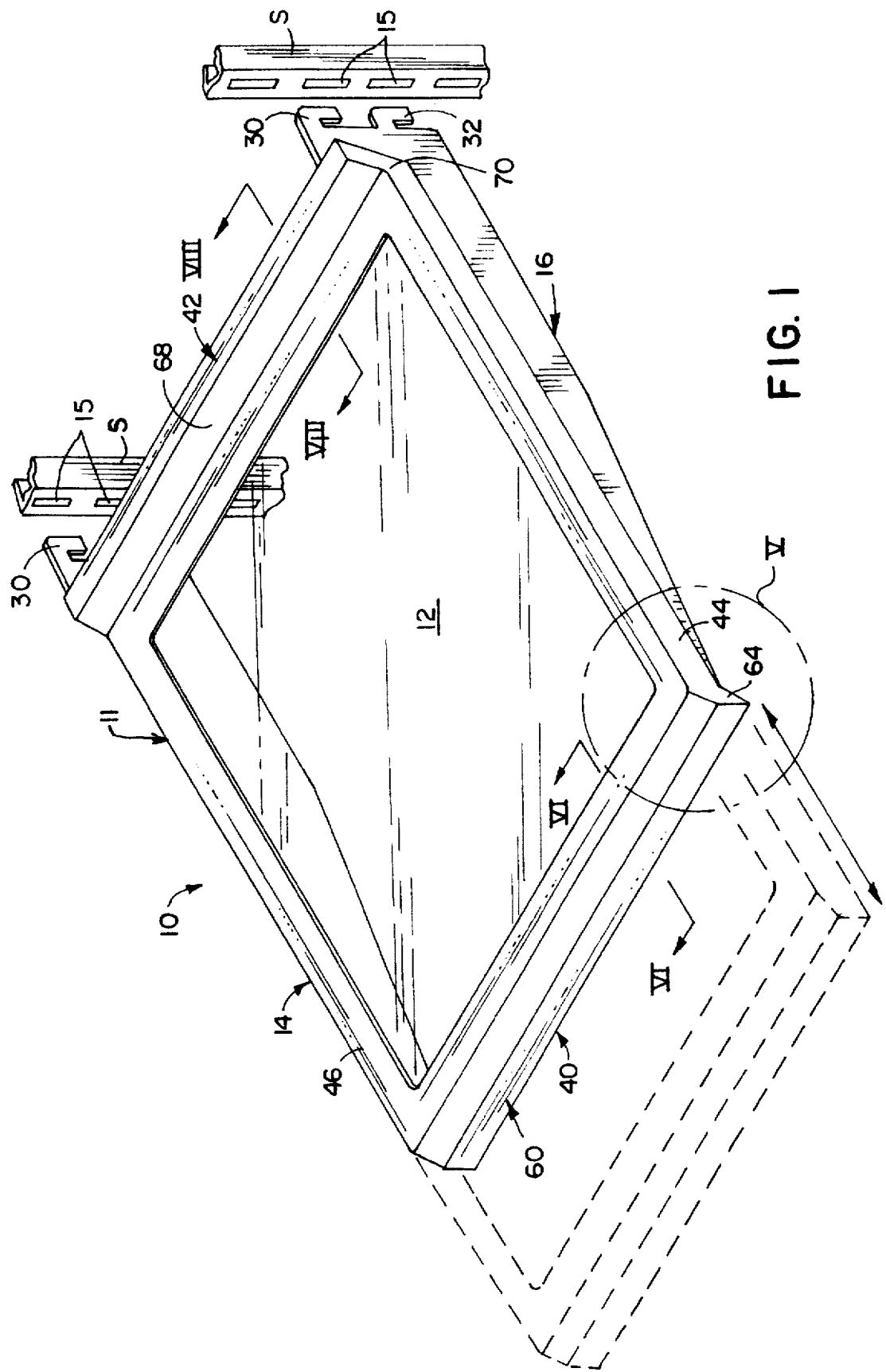
FIG. 1 is a top perspective view of a first embodiment of the sliding shelf assembly of the present invention.

Referring now to the drawings in greater detail, FIGS. 1-13 illustrate a first embodiment 10 of a sliding refrigerator shelf assembly according to the present invention including a shelf member 11 having a generally planar shelf panel 12, a molded, resinous perimeter rim 14 circumscribing shelf panel 12, and a rigid, shelf support frame 16 (FIG. 2) slidably supporting shelf member 11 for sliding movement between a retracted position (solid lines in FIG. 1) and an extended position (phantom lines in FIG. 1) in a refrigerated compartment such as a refrigerator for food products. Sliding shelf assembly 10 is preferably cantilevered forward by support frame 16 from a pair of spaced, vertical support tracks S (FIG. 1) mounted within the refrigerated compartment, each support track S including a plurality of aligned, vertical slots 15 adapted to receive mounting hooks 30, 32 from support frame 16 as described hereinafter. Shelf 10 may, of course, be made in various widths, narrower or wider than that shown in FIG. 1, to accommodate desired refrigerator cabinet widths and various spacing of tracks S.

Figure 2:
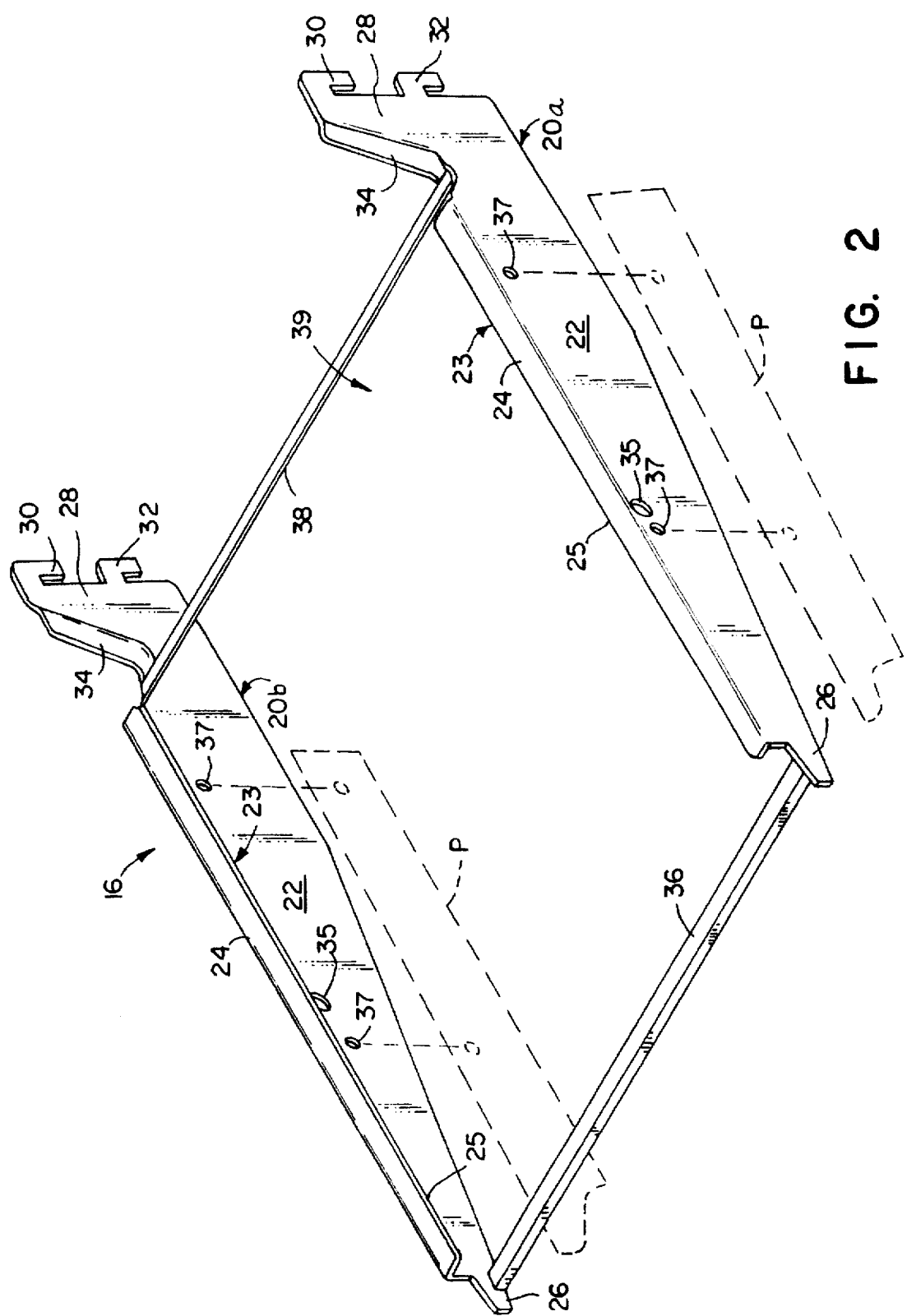
FIG. 2 is atop perspective view of the shelf support frame for the shelf assembly of FIG. 1.

As is best seen in FIGS. 2 and 3, shelf support frame 16 includes a pair of laterally spaced side support brackets 20a, 20b, each of which has an inverted L shape when viewed in cross section as shown in FIG. 4. Brackets 20a, 20b each include a generally vertically extending, elongated body 22, and a laterally inwardly extending support flange 23 extending at a right angle to body 22 and having a generally planar shelf support surface 24 along the top edge of the bracket for the majority of its length. A front, reduced height portion 26 on each bracket extends forwardly below the level of shelf support surfaces 24 to provide an access area for telescopingly inserting shelf member 11 thereon as described below. The rear end 28 of each L-shaped bracket 20a, 20b includes a mounting hooks 30, 32. Hooks 30, 32 are adapted to be received in slots 15 of vertical support tracks S (FIG. 1) when shelf assembly 10 is mounted in a refrigerated compartment as mentioned above. Each rear mounting portion 28 includes an offset upper flange 34 adapted to be received within a molded recess at the rear of molded rim 14 on shelf 11 as discussed below. The top surfaces 24 of support flanges 23 are preferably co-planar and horizontal when supported in the refrigerator. Side edges 25 of flanges 23 and the side surfaces of bodies 22 act as guide surfaces for shelf 11 during sliding movement. The body portion 22 of each bracket 20a, 20b also includes a circular opening 35 adapted to receive a slide limiting insert 72 as described below to restrict the forward sliding movement of shelf member 11 on the shelf support frame 16. A pair of spaced circular apertures 37 allow the brackets to receive rivets or other fasteners for securing a pan or crisper support P (shown in phantom in FIG. 2) if desired. Support P would allow suspension of a slide-out pan or storage bin for meats, vegetables and produce, or the like.

Brackets 20a, 20b are preferably supported parallel to one another in spaced lateral positions by a pair of rigid cross members 36, 38, each of which also has an L-shaped cross section for strength and rigidity. Brackets 20a, 20b are preferably welded to the ends of cross members 36, 38 to form a rigid framework enabling the support of shelf member 11 in both extended and retracted position either when fully loaded with items to be refrigerated or when empty. Cross members 36, 38 define an opening 39 therebetween in the framework. Mounting hooks 30, 32, when engaged with vertical tracks S, fully support the shelf without the necessity of any additional supports extending from the sides of the refrigerated compartment into contact with brackets 20a, 20b or the like. Each bracket and cross member is preferably stamped from steel. Shelf support frame 16 preferably is powder-coated with an epoxy polyester coating, preferably white in color, sold under Product No. 071-30-06 by Herberrs Powder Coatings Inc., of Hilliard, Ohio. The powder coating provides both a reduced friction, lubricous surface for shelf member 11 to slide on as well as providing protection from corrosion due to contact with spilled liquids, water and the like. Preferably, shelf support surfaces 24 are co-planar as shown in FIG. 2, although they could be positioned in offset planes depending on the design of the shelf member fitted thereon.

Referring now to FIGS. 1 and 3–9, shelf panel 12 is preferably a planar sheet of light transmitting material, such as optically clear tempered glass, to enhance light distribution through the refrigerated compartment. Panel 12 includes a perimeter edge 18 (FIGS. 4 and 6) which is embedded and secured within molded rim 14 generally above spaced support flanges 23 on brackets 20a, 20b in shelf support frame 16 as shown in FIG. 4. Rim 14 is preferably molded around the entire perimeter edge 18 of shelf panel 12. Rim 14 extends above panel 12 around the entire panel to confine spills and is molded for tight engagement and liquid sealing with panel 12 to prevent seepage under the rim and between the glass and rim as is explained in co-pending, commonly assigned United States patent application Ser. No. 07/665,661, filed Mar. 7, 1991, entitled MOLDED REFRIGERATOR SHELF, now issued as U.S. Pat. No. 5,362,145, the disclosure of which is hereby incorporated by reference herein. Molded rim 14 includes an integral front strip 40, integral rear strip 42 and parallel side strips or portions 44, 46, all of which are molded in one piece on the shelf member 12 in a single molding operation, as is explained more fully below. The front, rear and side portions 40, 42, 44, 46 of molded rim 14 each include molded portions 14a, 14b, 14c (FIG. 6) which embed and envelope three sides or surfaces of the perimeter edge 18 of panel 12 to securely retain the panel in the shelf member.

Each molded side portion 44, 46 includes an integral, substantially closed, slide channel 48 generally vertically aligned with the perimeter edge 18 of shelf panel 12 but spaced therebelow by intermediate molded portions of side portions 44, 46, as shown in FIG. 4. Each slide channel 48 defines a pair of laterally spaced outer and inner guide flanges 50, 52 which depend downwardly and are generally flush with the side surfaces of side portions 44, 46. Inner guide flange 52 also includes an integral laterally outwardly extending flange 54 which extends under substantially the full extent of flange 23 on L brackets 20a, 20b. A stop member 56 is molded integrally with and depends downwardly from flange 54 at the rear of the shelf for engagement with shelf support frame 16 as is explained more fully below. The upper surface 58 of slide channel 48 is generally horizontal and parallel to the perimeter 18 of shelf panel 12 and provides a slide surface adapted to engage the top surface 24 of flange 23 to allow sliding movement of the shelf member 11 with respect to support frame 16. The front end 55 of slide channel 48 is closed (FIG. 5) while the rear of the channel opens into the area beneath rear strip 42 to allow insertion of support flanges 23. As will be understood from FIGS. 4 and 6, the size of slide channel 48 is oversized and larger than the size of flange 23 and the upper portion of vertical body 22 of brackets 20a, 20b to provide sufficient clearance for ease in sliding action while maintaining lateral guidance via flanges 50, 52 with restriction against vertical movement of the shelf away from brackets 20a, 20b via flanges 54.

As seen in FIGS. 1, 5 and 6, the front strip 40 of molded rim 14 includes an outwardly and downwardly extending flange 60 including an indicia area 62 for molding or imprinting of appropriate information, trademarks or the like. If desired, area 62 may include a recess for such information. Flange 60 includes sides 64 which form a downwardly opening enclosure with flange 60 to house and shield the projecting ends 26 of frame 16 when the shelf member 11 is received thereover. The lowermost edge 66 of front strip 40 provides a convenient area for grasping the shelf for extension and retraction.

As is best seen in FIGS. 1, 3 and 7–9, rear strip 42 of molded rim 14 extends upwardly and rearwardly along surface 68 and includes sides 70 forming a generally rearwardly opening enclosure which covers offset edges 34 of rear mounting portions 28 on brackets 20a, 20b when the shelf member 11 is retracted.

Preferably, rim 14 is formed from a moldable, resinous material such as a thermoplastic copolymer, most preferably TENITE™ polypropylene sold under Product No. P5M4K-007 by Eastman Plastics of Kingsport, Tenn. Such material is a combination of ethylene and polypropylene, although other structural, resinous plastics, such as ABS or polyvinylchloride could be used. Preferably, a coloration pigment may be added to the moldable plastic used for molding rim 14 prior to molding to provide a desired color to the rim. For example, titanium dioxide may be added for a white coloration.

While the liquid-tight seal formed between molded rim 14 and glass shelf panel 12 performs well, depending on the specific resinous plastic chosen, one may wish to enhance that seal by coating perimeter edge 18 of the glass panel 12 in the areas to be engaged by the molded rim with a primer layer or coating prior to molding of the rim. Such primer layer or coating is preferably a heat activatable, resinous material which promotes and facilitates the adhesion of the rim material to the glass shelf member 12.

With reference to FIGS. 3, 4 and 10–13, a resilient, limit member or insert 72 is preferably received in opening 35 of each bracket side 22 to limit the forward travel of the sliding shelf member 11 when extended. Preferably, insert 72 is molded from a resinous plastic material such as acetal, available from E. I. DuPont de Nemours Co., Wilmington, Del., and includes a head 74 and a hollow, cylindrical body 76 extending perpendicularly from the underside of head 74. Body 76 includes a central, circular opening 77 and is notched at 78 to receive the thickness of bracket body 22 when the insert is received in aperture 35, as shown in FIG. 13. As will be understood from FIG. 13, the height and length of body 76 is sufficient to extend into the path of molded stop 56 when insert 72 is received in aperture 35 such that further forward sliding movement of shelf member 11 is limited by the engagement of stop 56 and body 76. The resiliency of body 76 allows it to compress and slide through aperture 35 and snap outwardly into the position shown in FIG. 13. Moreover, should shelf member 11 be pulled outwardly with significant force, body 76 will bend slightly to absorb some of the energy as shelf member 11 is stopped against the limiting insert.

As will be best understood from FIGS. 1–3, after manufacture, shelf member 11 is slidably telescopingly mounted on inwardly extending, co-planar flanges 23 of frame 16 from the front edges of those flanges. Flanges 23 are received in the rearwardly opening slide channels 48 and shelf 11 is slid rearwardly until the inside surface of rear strip 42 is received against offset areas 34 of rear portions 28 of brackets 20a, 20b. Thereafter, limiting insert 72 is pushed into place through apertures 35. Forward extension of shelf member 11 is obtained by pulling on lip 66 of front strip 40 typically with a pull effort of 1 to 2 pounds, while guide members 50, 52 guide the sliding motion of slide surface 58 on flanges 23. Forward extension of shelf member 11 is limited by the engagement between stops 56 and inserts 72, as described above. In the extended position, items can be supported on the forward edge of shelf 12 without fear of the shelf member 11 tipping forwardly and spilling the item due to the extent of flanges 54 under flanges 23 which restrict vertical movement of the shelf away from the shelf support frame 16. Shelf member 11 may then be retracted by pushing it inwardly using front strip 40 until rear strip 42 engages offset portions 34 of rear mounting portions 28 as shown in FIG. 8. The vertical height of rear strip 42 helps to catch and support any taller items which might tip rearwardly during sliding movement or storage of items on the refrigerator shelf. Preferably, shelf support frame 16 allows shelf assembly 10 to be vertically adjusted within the refrigerator compartment on support tracks S. As noted above, hooks 30, 32 are adapted for releasable engagement with shelf tracks S to suspend the brackets, support frame and shelf assembly. The shelf assembly may be positioned at any one of a plurality of locations corresponding to the locations of the aligned slots 15 in the tracks. The overall size of assembly 10 is preferably slightly smaller than the inside dimensions of the refrigerated compartment in which it is used to provide air circulation space between the sides 22 of brackets 20a, 20b and the sidewalls of the refrigerator as well as between rear strip 42 and the rear wall of the refrigerator. Further, the overall length of shelf member 11 is determined to provide air circulation space between the front edge and the door of the refrigerator (not shown).

With reference to FIGS. 14–21, a second embodiment 100 of the sliding shelf assembly for refrigerated compartments is illustrated. Shelf assembly 100 is similar to assembly 10 but includes a shelf member 101 of slightly differing configuration having a molded stop 122 adapted for engagement with a cross member on the shelf support frame 130, as explained more fully below. As shown in FIGS. 14–16, shelf member 101 includes a generally planar shelf panel 102, preferably formed from optically clear tempered glass and an upstanding molded rim 104 circumscribing the entire perimeter edge 106 of shelf panel 102 and forming a liquid-tight seal therewith. Rim 104 includes parallel front and rear portions 108, 110 and parallel side portions 112, all of which are molded integrally and in one piece onto the perimeter edge 106 of panel 102 in a suitable mold apparatus, as explained below. Just as in shelf member 11, molded rim 104 includes an integral slide channel 114 (FIG. 19) molded beneath perimeter edge 106 to include spaced, lateral outer and inner guide flanges 116, 118 and a laterally inwardly extending flange 120 extending from guide flange 118. As shown in FIGS. 14, 15, 20 and 21, an elongated stop member 122 is molded integrally with and depends downwardly from the bottom surface of flange 120 at a position flush with the inner side of side portion 112. Stop 122 tapers rearwardly such that its bottom edge is inclined upwardly toward the rear of shelf 101 to enable telescopic mounting of the shelf member on support frame 130. The forward edge 124 of stop 122 extends downwardly a distance sufficient to engage the rear edge of a cross member 134 on the support frame, as explained below. Shelf member 101 may be extended and retracted by grasping the downwardly extending lip 126 on front portion 108 as shown in FIG. 20. Just as in assembly 10, slide channel 114 is oversized and larger than the support flange 138 from support bracket 132 adapted to be fitted therewithin to allow ease in sliding movement. Likewise, flanges 116, 118 guide such movement while lower flange 120 prevents lifting or tipping of the shelf when extended or retracted.

As will be understood from FIGS. 14–16, a shelf support frame 130 similar to frame 16 in assembly 10 is adapted for use with shelf member 101. Frame 130 includes a pair of L-shaped support brackets 132 which are spaced laterally and formed into a rigid framework by front and rear L-shaped cross members 134, 136. Each bracket 132 includes an inturned, generally planar, elongated flange 138. As shown in FIG. 21, flanges 138 are received in the rearwardly opening slide channels 114 such that the top surfaces of flanges 138 engage slide surfaces 119 in the slide channels to allow extension and retraction of shelf 101. Forward sliding movement of shelf 101 is limited by engagement of front edge 124 of stop 122 with the rear facing edge of front cross member 134 as shown in FIG. 20. During assembly, the clearance provided by the enlarged size of slide channel 114 and the camming action provided by inclined bottom surface of stop 122 allow shelf 101 to be cammed over cross member 134 until the front edge 124 is received behind the cross member. As in assembly 10, brackets 132 also include mounting hooks 140 for mounting the assembly in a desired but vertically adjustable position on vertically extending support tracks such as those shown at S in FIG. 1. Also, molded rim 104 is preferably formed from a thermoplastic copolymer of ethylene and polyethylene, preferably TENITE™ polypropylene P5M4K-007 sold by Eastman Plastics. Similarly, frame 130 includes brackets and cross members stamped from steel and welded together and powder-coated with epoxy polyester available from Herberts Powder Coatings Inc. of Hilliard, Ohio, under Product No. 071-30-06.

As shown in FIGS. 22–27, a third embodiment 150 of the sliding shelf assembly is illustrated where like parts are indicated by like prime numbers. Embodiment 150 preferably includes a modified shelf member 160 and a rigid steel and epoxy polyester powder-coated shelf support frame 130'. Frame 130' is substantially similar to shelf support frame 130 except for the addition of a downwardly bent limit flange 152 formed in support flange 138' and an upwardly extending limit stud 154 aligned with flange 138' in rear cross member 136'.

Figure 26:
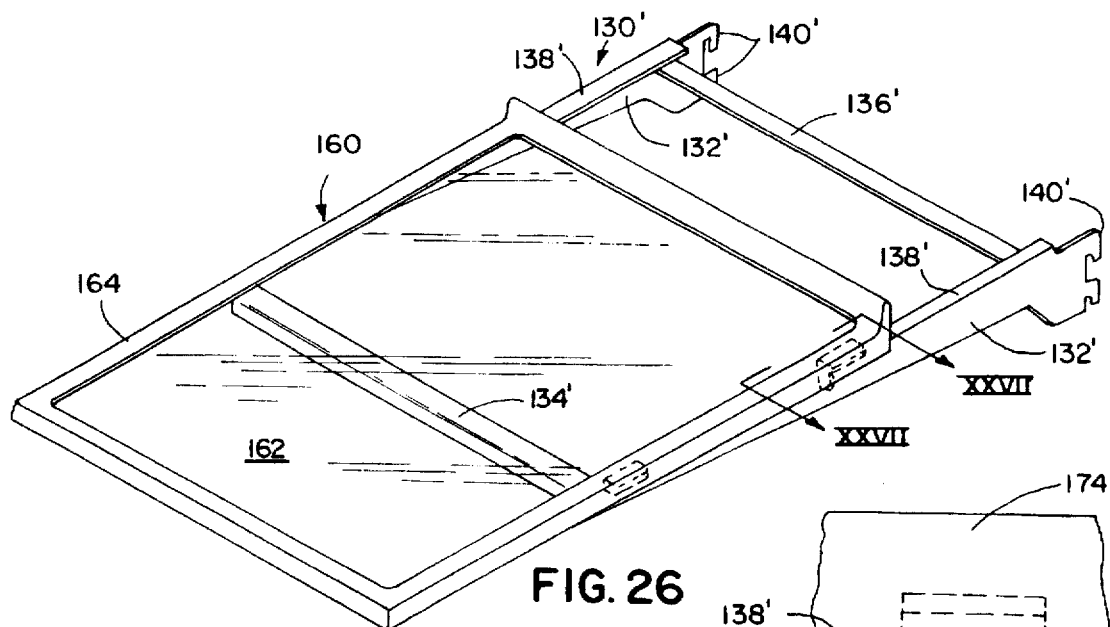
FIG. 26 is a top perspective view of the shelf assembly of FIG. 22 with the shelf member shown in extended position.
Figure 27:
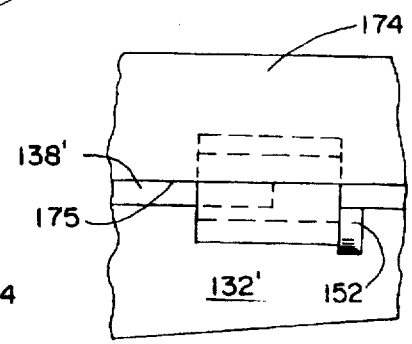
FIG. 27 is a fragmentary, side elevation taken along plane XXVII—XXVII of FIG. 26.
Figure 28:
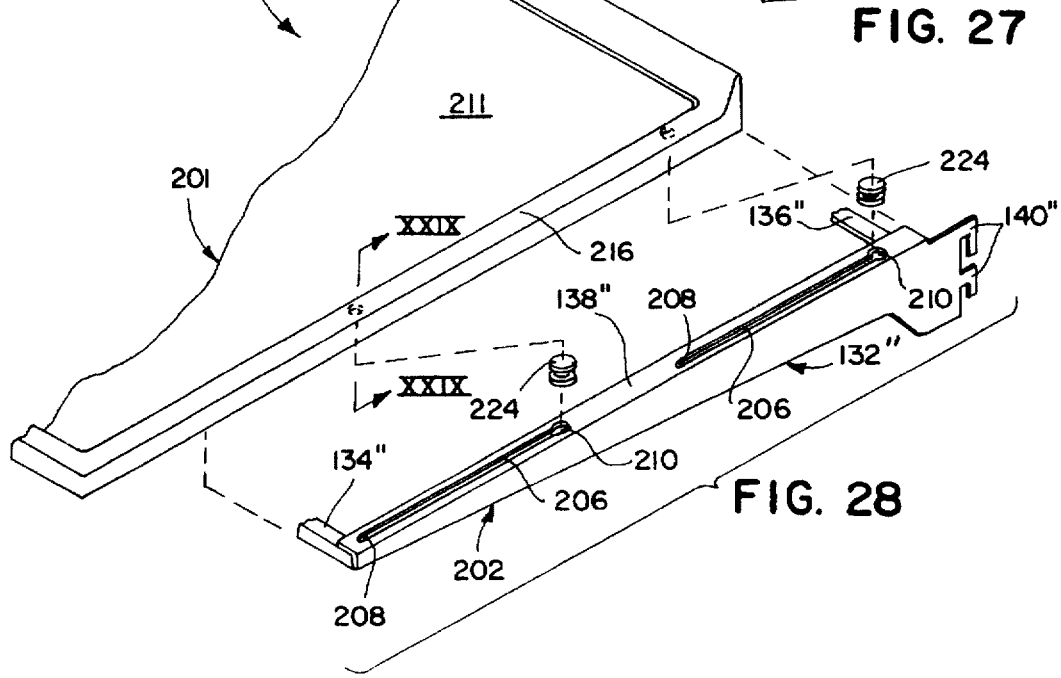
FIG. 28 is a fragmentary, top perspective, exploded view of a fourth embodiment of the shelf assembly of the present invention.

Modified shelf member 160 includes a preferably optically clear tempered glass shelf panel 162 and a molded rim 164 circumscribing the perimeter edge of panel 162 as in shelf members 11 and 101. As shown in FIGS. 22 and 26, molded rim 164 includes parallel front and rear portions 170, 172, and parallel side portions 174, 176, all molded in one piece around the entire panel 162 such that the perimeter is sealingly embedded therein. Preferably, molded rim 164 is also formed from a thermoplastic copolymer of ethylene and propylene. Instead of the inclusion of an integral, molded slide channel beneath the perimeter edge 166 of panel 162, however, shelf member 160 includes rigid, downwardly depending, U-shaped inserts 168 embedded in the molded rim.

Rigid inserts 168 are insert molded in spaced pairs in the lower sliding surfaces 175, 177 of side portions 174, 176 generally vertically aligned with the perimeter 166 of panel of 162, as shown in FIGS. 24 and 25. Inserts 168 are U-shaped in section and include upper and lower flanges 178, 180 joined by flange 182. When embedded within the side portion of the molded rim, flange 178 is spaced below perimeter edge 166 and extends generally parallel thereto to resist removal of the insert from the molded side portion. Flange 182 extends generally perpendicular to the perimeter edge 166 while flange 180 is generally parallel to flange 178 and panel 162 but spaced below sliding surface 175, 177 such that it extends around and under flange 138' from the shelf support frame. Accordingly, flanges 182 provide lateral guidance during sliding movement of shelf member 160 on flanges 138', while flanges 180 resist tipping and lifting of the shelf member 160 from the support frame.

As will be understood, the rear edge of flange 180 on the rearmost insert 168 is adapted to engage limit stud 154 to limit rearward movement of the shelf member 160 on the support frame. Likewise, the forward edge of flanges 180 of the same rearmost inserts 168 are adapted to engage limit members 152 to limit further extension when the shelf is pulled outwardly and extended. The area beneath flanges 138' and between limit members 152, 154 therefore defines the extent of sliding movement of shelf assembly 150 (see distance M in FIG. 23). However, in the extended position shown in FIG. 26, items for refrigeration are fully and adequately supported even on the outer end of the shelf due to the horizontal extent of flanges 138' and the vertical tipping and lifting restriction provided by flanges 180 of inserts 168. Assembly of shelf member 160 on rigid frame 130' is accomplished by telescoping shelf member 160 over flanges 138' with the flanges 180 of inserts 168 in the positions shown in FIGS. 24 and 25 before limit members 152 are bent downwardly from the support flanges 138'. After the shelf member 160 is in the position shown in FIG. 22, limit members 152 are bent downwardly to confine the shelf as described above.

As shown in FIGS. 28–32, a fourth embodiment 200 of the sliding shelf assembly of the present invention is illustrated where like parts are indicated by like numerals with the addition of double primes thereon. Shelf assembly 200 includes shelf member 201 slidably mounted for extension and retraction on a rigid shelf support frame 202. Shelf support frame 202 is similar to shelf support frames 130 and 130' and includes L-shaped support brackets 132" spaced by rigid cross members 134" and 136". Rear cross member 136" includes a slide limiting stud 204 (FIGS. 31 and 32) which restricts rearward sliding travel of shelf member 201 on the support frame as explained hereinafter. Instead of bent limit member 152 as in support frame 130', however, shelf support frame 202 includes elongated, keyhole-shaped guide slots 206 extending through support flanges 138". Each guide slot 206 includes parallel side edges, a closed forward end 208 and an enlarged opening forming a closed, rear end 210. Brackets 132" also include mounting hooks 140" for securing the shelf support frame 202 and supported shelf member 201 on suitable vertical support tracks such as those shown at S in FIG. 1. The entire rigid frame 202 is preferably powder-coated with epoxy polyester as in the earlier embodiments 10, 100, and 150.

Shelf member 201 includes an optically clear, tempered glass panel 211 and a molded rim having parallel front and rear sections 212, 214 and parallel, opposed side portions 216, 218. Each side portion includes an integral, molded guide flange 220 (FIGS. 29 and 31) on the outer side for engaging the vertical side surface of brackets 132" to guide sliding movement. In addition, lower slide surfaces 222 of side portions 216, 218 include a pair of spaced, double-headed stud inserts 224 embedded therewithin generally in the center and at the rear of each side portion. Each stud insert 224 includes cylindrical body 226 adapted to be received through and between the parallel side edges of slots 206 to guide the sliding movement of the shelf member 201 in conjunction with flanges 220. At the upper end of cylindrical body 226 is a disc-shaped head 228 embedded within side portion 226 at a position spaced below the perimeter edge of glass panel 211 to resist withdrawal of the stud. At the lower end of body 226 is a similar disc-shaped head 230 which extends below support flange 138" and slots 206.

Figure 29:
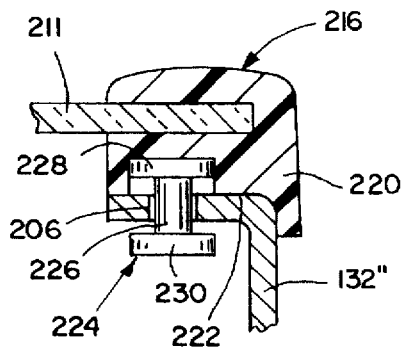
FIG. 29 is a fragmentary, sectional view taken along plane XXIX—XXIX of FIG. 28.
Figure 31:
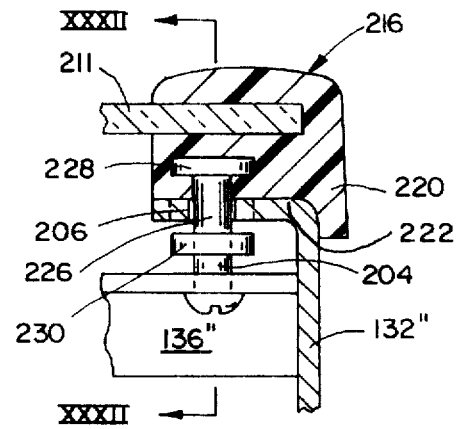
FIG. 31 is a fragmentary, sectional view taken along plane XXXI—XXXI of FIG. 30.
Figure 30:
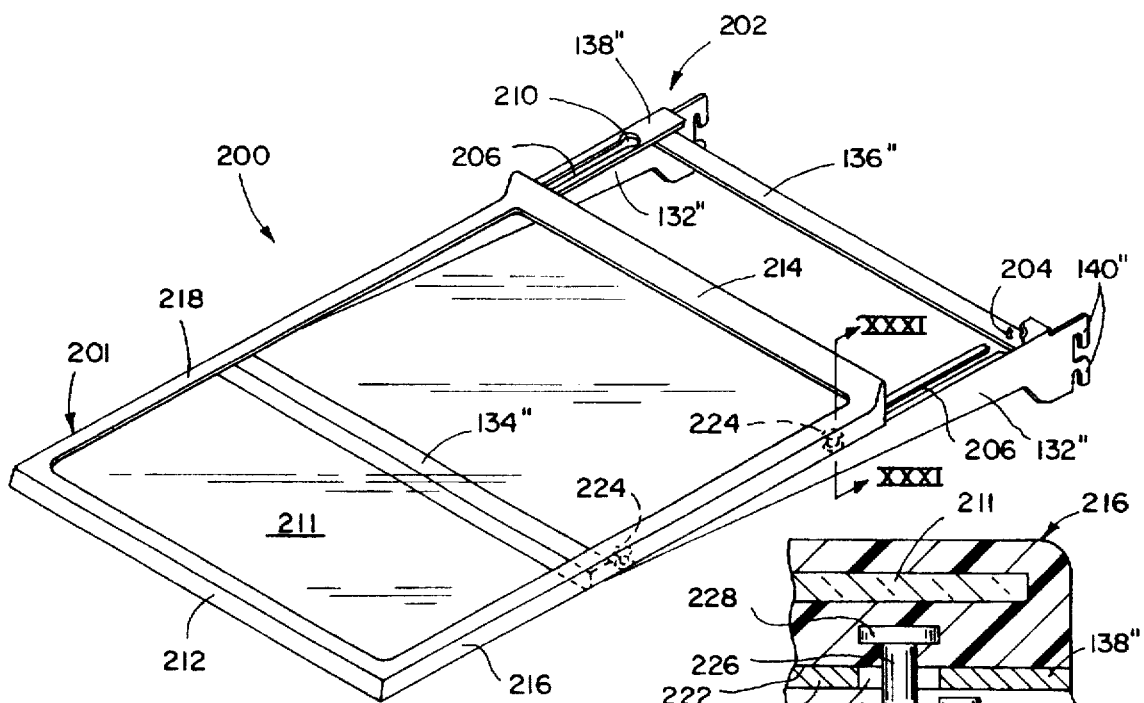
FIG. 30 is a top perspective view of the shelf assembly of FIG. 28 showing the shelf member in extended position.
Figure 32:
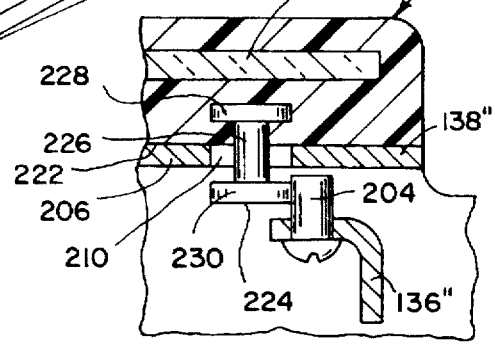
FIG. 32 is a fragmentary, sectional view taken along plane XXXII—XXXII of FIG. 31.

As will now be understood from FIGS. 28–32, when inserts 224 are embedded in the sliding surfaces 222 of side portions 216, 218 as shown in FIGS. 29, 31 and 32, shelf member 201 may be mounted on shelf support frame 202 by placing shelf member 201 in registry with support flanges 138" such that heads 230 of inserts 224 are aligned with enlarged openings 210. Shelf member 201 is then moved downwardly such that sliding surfaces 222 engage support flanges 138" while heads 230 extend through openings 210 of slots 206. Thereafter, shelf member 201 may be grasped and slid forwardly on its slide support surfaces and flanges 138" until bodies 226 of inserts 224 engage forward ends 208 of slots 206 to limit further extension. Likewise, rearward movement of the shelf is limited by engagement of heads 230 with studs 204 on cross member 136" in the retracted position of the shelf. In either case, items to be refrigerated are fully and adequately supported on panel 211 while flanges 220 and bodies 226 guide the sliding movement and heads 230 prevent lifting of the shelf member 201 from the support frame 202 in all positions including the extended position except the retracted position shown in FIGS. 31 and 32.

With reference to FIGS. 33–38, the preferred method for manufacturing the shelf members used in the shelf assemblies 10 and 100 will be understood. The manufacturing method incorporates the use of a reusable, rigid mold insert or core 250 which is generally similar in shape to L-shaped support brackets 20a, 20b and 132. Core 250 is preferably formed from a ferro-magnetic material such as steel, preferably includes a corrosion preventing coating such as zinc-dichromate, has a generally planar, retaining body 252 and an integral, laterally extending flange 254 extending along the full length of body 252 at one edge. Flange 254 defines a slide channel forming portion which tapers to a thinner, free end edge 256. Core body 252 includes a series of spaced, apertures 258 used in manufacturing the core, as well as positioning apertures 260 adapted to receive positioning pins 314 for precisely locating the core within a mold apparatus as explained below.

With reference to FIG. 36, a preferred mold apparatus 275 for molding the shelf members 11, 101 is shown. Mold 275 includes a lower mold section 280 including a central recess 282 receiving a vertically reciprocable pressure pad or plate 284 preferably mounted on springs and guide bolts (not shown) and having a glass support surface 286. Lower section 280 also includes lateral slide recesses 290 at either side. Cooperating with lower mold section 280 is an upper mold section 292 having a lower surface 293 defining a parting line and an upper glass engaging and clamping surface 294. Together, glass engaging surface 294 of upper mold section 292 and glass support surface 286 of pressure pad 284 support, clamp and hold a planar sheet of glass such as panel 12, 102, 162 or 211 described above.

At either side of mold 275 in side recesses 290 is a slide 306 mounted on a cylinder rod 308 of a pneumatic or hydraulically operated fluid cylinder (not shown). Rod 308 is preferably fixed in a stationary position by threaded end 309 while slides 306 and fluid cylinders move inwardly and outwardly together when the fluid cylinders are operated. In combination, lower mold section 280, upper mold section 292, pressure pad 284 and slides 306 define a pair of mold cavities 312 adapted for forming the side portions 44, 46 or 112 of shelf members 11,101 described above. Mold cavities 312, of course, extend continuously into other portions of the upper and lower mold sections to define extensions thereof for forming the front and rear portions 40, 42 of the shelf members as is conventionally known in the molding industry.

As shown in FIG. 36, mold insert cores 250 are adapted for insertion with their slide channel forming sections 254 positioned within mold cavities 3 12, their retaining portions 252 extending outwardly and downwardly from the mold cavities for engagement by slides 306 including spring-biased positioning pins 314. Pins 314 extend through positioning apertures 260 after cores 250 are positioned against the side surface of the lower mold section and held in place by magnets 316. Subsequently, as the fluid cylinders are activated to move slides 306 inwardly against the cores 250, pins 314 accurately and precisely position the cores with respect to the perimeter edge of glass sheets 12, 102 such that the glass sheet perimeter edge will be spaced above section 254 and be properly embedded within the mold material in cavity 312 while retaining portion 252 will extend downwardly out of the molded rim portion, as shown in FIGS. 36 and 37.

Using the mold 275 as described above, the manufacturing process for producing shelf members 11, 101 will be understood. Initially, upper mold section 292 is moved away from lower mold section 280. Either manually or with a robot arm preferably having vacuum cups holding glass sheet 12, 102 and a pair of spaced cores 250 thereon, the glass panel is moved into the mold and loaded on glass support surface 286 of pressure pad 284. The perimeter side edges of the glass sheet extend into mold cavities 312. Simultaneously, both core inserts 250 are loaded manually or with the same robot arm by swinging them in against the side surfaces of the lower mold section beneath mold cavities 312 until magnets 316 grasp and hold the cores in position as shown in FIG. 36. The robot arm is moved out of the open mold assembly followed by closing of the mold. Both the upper and lower mold sections are preferably heated or cooled as necessary via internal fluid lines and heated or cooled water pumped therethrough to maintain a constant temperature during the molding operation. After closure of the upper and lower mold sections, with glass panel 12, 102 being held between the clamping surfaces 294 of the upper mold section and the glass support surfaces 286 of resiliently mounted pressure pad 284, the fluid cylinders are activated to move slides 306 inwardly. During such movement, spring-biased positioning pins 314 engage tapered holes 260 at two locations on each core 250 to finally and precisely locate the cores such that slide channel forming sections 254 are precisely positioned with respect to the perimeter edge of glass panel 12, 102 in the mold cavities.

After loading of the glass and cores, the preferred thermoplastic copolymer of ethylene and propylene mentioned above is injected into mold cavities 312. Injection is preferably made using a conventionally known hot runner injection system. Alternately, conventionally known sub gating, cold drop gating or edge gating injection methods can be used. Injection of the molten moldable material which is preferably heated during injection is made through small orifices, preferably at two or four positions on the underside of the front and rear portions of the shelf members such as at position A shown in FIG. 5. After injection, the moldable material is allowed to solidify and cure during a dwell time preferably of 10 to 15 seconds. Thereafter, slides 306 are moved outwardly by their associated fluid cylinders and the mold 275 is opened by raising the upper mold section 292. During such movement, an ejector plate (not shown) engages suitable stops positioned to halt further movement of the ejector plate while upper mold section 292 continues to its final position. Consequently, the shelf assembly including the molded side portions in cavities 312 and glass plate 12, 102 is moved downwardly away from the mold cavity portions in upper mold half 292 while being held by suitable vacuum cups (not shown) on upper mold section 292. Simultaneously, other vacuum cups (not shown) on lower mold section 280 are opened to atmosphere to release the glass panel. Subsequently, the robot arm is moved into the open mold assembly carrying a new glass panel and a fresh pair of spaced reusable cores 250 to retrieve the completed shelf member and position the new glass panel and core members as described above.

After removal of the molded shelf member from the mold 275, cores 250 remain embedded within the molded side portions 44, 46, 112, as shown in FIG. 37. While the moldable material is still warm and relatively flexible and pliable, cores 250 are slid out of the slide channels 48, 114 in the molded side portions using a rolling motion, either manually or in a fixture. If a fixture is used, the shelf assembly is mounted upsidedown and pneumatic or hydraulic cylinders are moved to engage the outer surfaces of the cores to move them in a rolling motion in the direction shown by the arrow in FIG. 37. Removal of the slide channel forming sections 254 of cores 250 leaves slide channels 48, 114 integrally molded as described above for receipt of the support surfaces of the shelf support frame in the manner indicated.

Manufacture of the shelf members 150, 200 may be accomplished in a similar mold apparatus to that shown at 275. Instead of positioning reusable cores 250 in the mold cavities, rigid inserts 168 or 224 are positioned to extend into the mold cavities for proper embedding within the molded rim portion in the manner described above.

As will also be understood, mold 275 may also be used to form a fixed, stationary shelf wherein fixed support brackets similar to brackets 20a, 20b or 132 are substituted for cores 250 in mold cavities 3 12. Such brackets remain in the molded side portions after removal from the mold. Accordingly, the molded sliding shelves made according to this method will have substantially the same overall appearance as a fixed shelf when made in the same mold apparatus.

While several forms of the invention have been shown and described, other forms will now be apparent to those skilled in the art, therefore, it will be understood that the embodiments shown in the drawings and described above are merely for illustrative purposes, and are not intended to limit the scope of the invention which is defined by the claims which follow.

The embodiments of the invention in which an exclusive property or privilege is claimed are defined as follows:

1. A shelf assembly for a refrigerated compartment comprising:

a shelf support including a pair of spaced, generally horizontal, generally parallel, shelf support surfaces, a guide surface on each shelf support surface extending at an angle to said shelf support surface, an undersurface beneath each shelf support surface, and at least one mounting member adapted to mount said shelf support in a refrigerated compartment;

a shelf member slidably mounted for extension and retraction on said shelf support, said shelf member including an article support surface and a pair of spaced side members, said side members being molded in one piece on said article support surface from a moldable material and extending along opposite sides of said article support surface, each side member including a slide surface slidably engaging one of said shelf support surfaces, at least one of said side members having a depending guide member adjacent said slide surface to guide sliding movement of said shelf member, said one guide member including a stop thereon, said guide member extending along said guide surface to limit lateral movement of said shelf member with respect to said shelf support, said guide member also including a laterally extending, lift restraining member, said lift restraining member extending under and immediately adjacent said shelf support undersurface and adapted to engage said undersurface in the event said shelf member is lifted to restrict vertical movement of said shelf member with respect to said shelf support; and said shelf support also including an elongated opening for receiving and allowing movement of said stop when said shelf member is slidably extended or retracted, and at least one limit surface for engaging said stop member to limit at least one of the extension or retraction of said shelf member.

2. The shelf assembly of claim 1, wherein said shelf support includes a pair of spaced, parallel support brackets, each bracket having one of said shelf support surfaces and one of said mounting members thereon.

3. The shelf assembly of claim 2, wherein each of said brackets is L-shaped and includes a body and a laterally extending flange extending at a right angle to said body, said flange having a top surface forming said shelf support surface.

4. The shelf assembly of claim 3, wherein said flanges on said brackets extend inwardly toward one another.

5. The shelf assembly of claim 3, wherein said one guide member is a rigid member having one portion embedded within said one side member and a second portion extending downwardly from said side member and extending along and under one of said flanges.

6. The shelf assembly of claim 5, wherein said rigid member is a U-shaped insert embedded in said slide surface of said one side member.

7. The shelf assembly of claim 6, wherein said insert extends around an edge of said one bracket flange in the space between said brackets, said stop including an edge of said U-shaped insert; said shelf support including at least one cross member extending between said brackets for spacing and supporting said brackets; said limit surface including a limit member on one of said brackets and said cross member for engagement by said edge of said insert.

8. The shelf assembly of claim 5, wherein said rigid member is a stud embedded in said slide surface of said one side member.

9. The shelf assembly of claim 8, wherein said one bracket flange includes a slot forming said elongated opening in said shelf support; said stud projecting into said slot; said slot having at least one closed end defining said limit surface.

10. The shelf assembly of claim 9, wherein said stud includes spaced, laterally extending flanges, one stud flange embedded in said one side member, the other stud flange extending under said one bracket flange.

11. The shelf assembly of claim 10, wherein said slot includes an enlarged area for receiving said other stud flange therethrough.

12. The shelf assembly of claim 2, wherein said shelf support includes at least one cross member extending between said brackets for spacing and supporting said brackets; said cross member including said limit surface; said stop adapted to engage a portion of said cross member in one position of said shelf member.

13. The shelf assembly of claim 1, wherein said shelf member includes a generally planar shelf panel having a perimeter edge thereon, and a rim molded on and circumscribing said perimeter edge, said rim being molded from a resinous polymeric material and including said side members; said guide member including a flange molded in one piece with said rim.

14. The shelf assembly of claim 13, wherein said stop is molded in one piece with said molded flange on said guide member.

15. The shelf assembly of claim 1, wherein said shelf support is a frame including a pair of spaced, L-shaped brackets and at least one cross member extending between said L-shaped brackets for spacing and supporting said brackets, said brackets each including a body and a laterally extending flange extending at a right angle to said body, said flange having a top surface forming said shelf support surface.

16. The shelf assembly of claim 15, wherein said limit surface is on one of said brackets.

17. The shelf assembly of claim 15, wherein said limit surface is on said cross member.

18. A shelf assembly for a refrigerated compartment comprising:
- a shelf support including a pair of spaced, generally horizontal, generally parallel, shelf support surfaces, a guide surface on each shelf support surface extending at an angle to said shelf support surface, an undersurface beneath each shelf support surface, and at least one mounting member adapted to mount said shelf support in a refrigerated compartment;
- a shelf member slidably mounted for extension and retraction on said shelf support, said shelf member including an article support surface and a pair of spaced side members, said side members being molded in one piece on said article support surface from a moldable material and extending along opposite sides of said article support surface, each side member including a slide surface slidably engaging one of said shelf support surfaces, at least one of said side members having a depending guide member adjacent said slide surface to guide sliding movement of said shelf member, said one guide member including a stop thereon, said guide member extending along said guide surface and under and immediately adjacent said shelf support undersurface to limit lateral and vertical movement of said shelf member with respect to said shelf support;
- said shelf support also including an elongated opening for receiving and allowing movement of said stop when said shelf member is slidably extended or retracted, and at least one limit surface for engaging said stop member to limit at least one of the extension or retraction .of said shelf member;
- said shelf support including a pair of spaced, parallel support brackets, each bracket having one of said shelf support surfaces and one of said mounting members thereon, each of said brackets being L-shaped and including a body and a laterally extending flange extending at a right angle to said body, said flange having a top surface forming said shelf support surface;
- said guide member extending along and under one of said flanges on one of said brackets; and,
- said guide member and stop being molded integrally and in one piece with said one side member.

19. The shelf assembly of claim 18, wherein said one side member also includes a second guide member molded integrally and in one piece therewith and spaced from the first said guide member, said one side member including a molded channel receiving said one bracket flange and defining said guide members.

20. The shelf assembly of claim 19, wherein said one bracket includes a limit member thereon, said stop adapted to engage said limit member in one position of said shelf member.

21. A shelf assembly for a refrigerated compartment comprising:
- a shelf support including a pair of spaced, generally parallel, shelf support surfaces;
- a shelf member slidably mounted for extension and retraction on said shelf support, said shelf member including a shelf panel having a perimeter edge, and a rim molded on said perimeter edge from a moldable material, said rim including side portions extending along opposite sides of said shelf panel, each side portion including a slide surface slidably engaging one of said shelf support surfaces, and a pair of spaced, depending guide members molded in one piece with said rim and positioned on either side of one of said shelf support surfaces to guide sliding movement of said shelf member; at least one of said guide members including a stop molded in one piece with said rim; and
- said shelf support also including an elongated opening for receiving and allowing movement of said stop when said shelf member is slidably extended or retracted, and at least one limit surface for engaging said stop member to limit at least one of the extension or retraction of said shelf member.

22. The shelf assembly of claim 21, wherein said shelf support includes a pair of spaced, parallel, L-shaped support brackets each having a body and a laterally extending flange extending at a right angle to said body, said flange having a generally horizontal top surface forming said shelf support surface.

23. The shelf assembly of claim 22, wherein said flanges on said brackets extend inwardly toward one another.

24. The shelf assembly of claim 22, wherein one of said guide members of each side portion of said rim includes a portion molded in one piece therewith which extends under said laterally extending flange to restrict vertical movement of said shelf member with respect to said L-shaped brackets.

25. The shelf assembly of claim 24, wherein at least one of said brackets includes a limit member thereon, said stop adapted to engage said limit member in one position of said shelf member.

26. The shelf assembly of claim 21, wherein said shelf support includes an undersurface; one of said side portions including a laterally extending, lift restraining member on one of said guide members, said lift restraining member adapted to engage said undersurface to restrict vertical movement of said shelf member with respect to said shelf support surfaces.

27. A sliding shelf assembly for refrigerators comprising:
- a generally planar shelf member having a top surface for supporting articles to be refrigerated, and a perimeter edge;
- a rim molded from a moldable material around said perimeter edge, said rim including generally parallel side portions extending along opposite portions of said perimeter edge of said shelf member, each side portion including a slide channel molded therewithin, said slide channels each defining a generally horizontal slide surface, a molded guide member for guiding sliding movement of said shelf assembly, and an opening through which a shelf support is received for engagement with said slide surface; said guide member extending downwardly from said slide surface to limit lateral movement of the shelf support member when received in said slide channel, said guide member including a laterally extending, lift restraining member, said lift restraining member extending laterally such that said lift restraining member is spaced beneath said slide surface and is adapted to be positioned immediately adjacent and below an undersurface on a shelf support member to limit vertical movement of the shelf support member when received in said slide channel; and, a stop on said rim adapted to be received in an elongated opening formed in the shelf support to limit sliding travel of said shelf assembly when mounted on the shelf support.

28. A sliding shelf assembly for refrigerators comprising:

a generally planar shelf member having a top surface for supporting articles to be refrigerated, and a perimeter edge;

a rim molded from a moldable material around said perimeter edge, said rim including generally parallel side portions extending along opposite portions of said perimeter edge of said shelf member, each side portion including a slide channel molded therewithin, said slide channels each defining a slide surface, first and second molded guide members for guiding sliding movement of said shelf assembly, and an opening through which a shelf support is received for engagement with said slide surface; said first and second guide members on each side portion being spaced laterally from and extending parallel to one another and depending downwardly adjacent said slide surface; and a stop on said rim for engaging a portion of the shelf support to limit sliding travel of said shelf assembly when mounted on the shelf support.

29. The shelf assembly of claim 28, wherein each of said slide channels is spaced from and extends generally parallel to said shelf member.

30. The shelf assembly of claim 29, wherein each of said slide channels is aligned with and below said perimeter edge of said shelf panel.

31. The shelf assembly of claim 30, wherein said shelf member is glass and said moldable material is a resinous thermoplastic copolymer.

32. The shelf assembly of claim 28, wherein each of said slide channels is adapted to receive a slide support flange of a support bracket, each of said slide channels being oversized and larger than said support flange to allow sliding movement therebetween.

33. A sliding shelf assembly for refrigerators comprising:

a generally planar shelf member having a top surface for supporting articles to be refrigerated, and a perimeter edge:

a rim molded from a moldable material around said perimeter edge, said rim including generally parallel side portions extending along opposite portions of said perimeter edge of said shelf member, each side portion including a slide channel molded therewithin, said slide channels each defining a slide surface, a molded guide member for guiding sliding movement of said shelf assembly, and an opening through which a shelf support is received for engagement with said slide-surface; said guide member extending downwardly from and laterally under said slide surface such that said guide member is spaced beneath said slide surface and is addicted to be positioned immediately adjacent and below a shelf support member to limit lateral and vertical movement of the shelf support member when received in said slide channel; and a stop on said rim adapted to be received in an elongated opening formed in the shelf support to limit sliding travel of said shelf assembly when mounted on the shelf support, said stop molded integrally on said molded guide member.

34. A shelf assembly for a refrigerated compartment comprising:

a shelf support including a pair of spaced, generally horizontal, generally parallel, shelf support surfaces, a guide surface on each shelf support surface extending at an angle to said shelf support surface, an undersurface beneath each shelf support surface, and at least one mounting member adapted to mount said shelf support in a refrigerated compartment;

a shelf member slidably mounted for extension and retraction on said shelf support, said shelf member including an article support surface and a pair of spaced side members, said side members being molded in one piece on said article support surface from a moldable material and extending along opposite sides of said article support surface, each side member including a slide surface slidably engaging one of said shelf support surfaces, at least one of said side members including a depending guide member adjacent said slide surface to guide sliding movement of said shelf member, said one guide member including a stop thereon, said guide member extending along said guide surface to limit movement of said shelf member with respect to said shelf support, said guide member also including a laterally extending, lift restraining member, said lift restraining member extending under and immediately adjacent said shelf support undersurface and adapted to engage said undersurface in the event said shelf member is lifted to restrict vertical movement of said shelf member with respect to said shelf support; said guide member further including a rigid member having a first portion embedded within said one side member, and a second portion positioned along said guide surface and adjacent said shelf support undersurface to guide sliding movement and restrict vertical movement of said shelf member, said second portion of said rigid member including said stop thereon;

said shelf support also including an elongated opening for receiving and allowing movement of said stop when said shelf member is slidably extended or retracted, and at least one limit surface for engaging said stop member to limit at least one of the extension or retraction of said shelf member.

35. The shelf assembly of claim 34, wherein said first portion of said rigid member extends generally parallel to said slide surface of said one side member to resist withdrawal from said one side member.

36. The shelf assembly of claim 35, wherein said rigid member is a U-shaped insert, said second portion including an L-shaped portion of said insert.

37. The shelf assembly of claim 36, wherein said shelf support includes a pair of spaced, parallel support brackets, each bracket having one of said shelf support surfaces and one of said mounting members thereon; said L-shaped portion extending in the space between said brackets, said stop including an edge of said L-shaped portion; said shelf support including at least one cross member extending between said brackets; said limit surface including a limit member on one of one of said brackets and said cross member for engagement by said edge of said L-shaped portion.

38. The shelf assembly of claim 34, wherein said rigid member is a stud embedded in said slide surface of said one side member.

39. The shelf assembly of claim 38, wherein at least one of said shelf support surfaces includes a slot forming said elongated opening; said stud projecting into said slot; said slot having at least one closed end defining said limit surface.

40. The shelf assembly of claim 39, wherein said stud includes spaced, laterally extending flanges, one stud flange embedded in said one side member, the other stud flange extending under said shelf support surface.

41. The shelf assembly of claim 40, wherein said slot includes an enlarged area for receiving said other stud flange therethrough.

* * * * *